Figure 1:
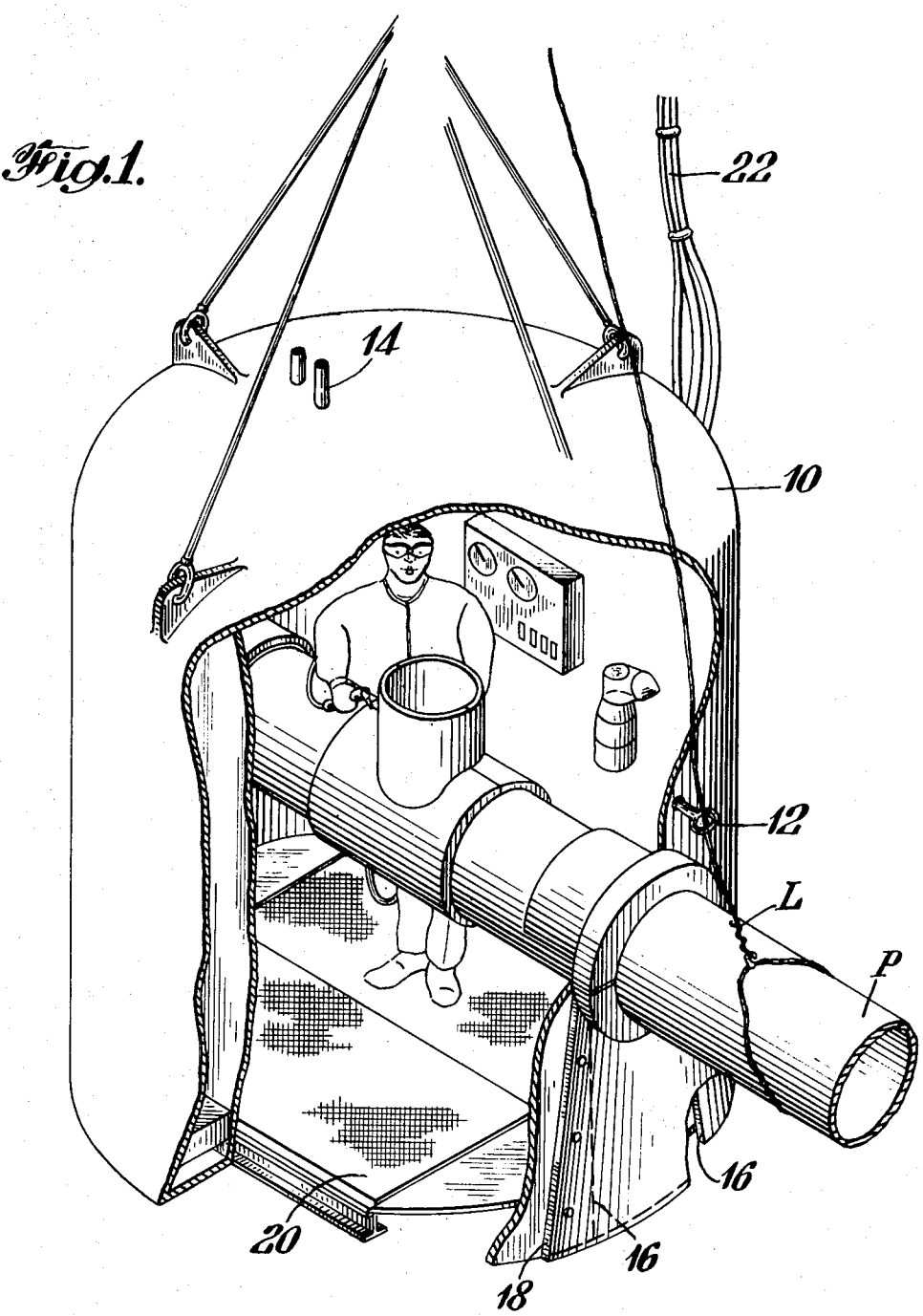

United States Patent

[11] 3,581,042

[72] Inventor Frank J. Pilia
　　　　　　Short Hills, N.J.
[21] Appl. No. 839,778
[22] Filed June 19, 1969
[45] Patented May 25, 1971
[73] Assignee Ocean Systems Incorporated
　　　　　　Reston, Va.
　　　　　　Continuation-in-part of application Ser. No.
　　　　　　664,784, Aug. 31, 1967.

[54] UNDERWATER WELDING METHOD
5 Claims, 2 Drawing Figs.

[52] U.S. Cl. .................................................. 219/61,
　　　　　　　　　　　　　　　　　　　　　　　　　　219/72
[51] Int. Cl. ................................................. B23k 9/16
[50] Field of Search ........................................ 219/121
　　　　　(EB), 121, 72, 69, 117, 50, 74, 75, 61, 137;
　　　　　　　　　　　　　　　　　　　114/16; 61/69, 69.1

[56] References Cited
UNITED STATES PATENTS

| | | | |
|---|---|---|---|
| 2,274,631 | 2/1942 | Meredith.................. | 219/75 |
| 2,519,453 | 8/1950 | Goodman................. | 114/16 |
| 2,667,751 | 2/1954 | Osborn..................... | 61/69 |
| 2,794,898 | 6/1957 | Gibson...................... | 219/75 |
| 2,863,983 | 12/1958 | Kane et al................. | 219/75 |
| 3,053,967 | 9/1962 | Gorman, et al............ | 219/74 |
| 3,253,113 | 5/1966 | Breymeier................. | 219/74 |
| 3,296,407 | 1/1967 | Wallace.................... | 219/75 |
| 3,299,645 | 1/1967 | Link......................... | 61/69 |
| 3,328,970 | 7/1967 | Giambelluca............. | 61/69 |
| 3,386,254 | 6/1968 | Connaly.................... | 61/69 |

*Primary Examiner*—J. V. Truhe
*Assistant Examiner*—J. G. Smith
*Attorneys*—Paul A. Rose, Thomas I. O'Brien, Dominic J. Terminello and Eugene Liberstein ABSTRACT: The invention provides a method of welding heavy metal sections located deep under water without having to raise the sections to the surface. The method consists of lowering a chamber having an open bottom until it encloses the area to be worked upon. Preferably a pressurized gas is introduced into the chamber as it is being lowered in order to prevent the water from rising beyond a certain level which is maintained in a dry condition. After the chamber is set in place, a pressurized gas is introduced to displace the remaining water in the chamber. Thereafter the chamber atmosphere is preferably maintained in a substantially inert condition and the weld made with a nonconsumable electrode-inert gas-welding apparatus operating with a 1/64- to ¼-inch arc length at 85 to 250 amps and at a voltage sufficient to maintain a stable arc.

PATENTED MAY 25 1971

3,581,042

INVENTOR
FRANK J. PILIA
BY Thomas J. O'Brien
ATTORNEY

UNDERWATER WELDING METHOD

This application is a continuation-in-part of U.S. application Ser. No. 664,784, filed Aug. 31, 1967.

This invention relates to underwater working and more particularly to a method of making a high quality weld between heavy metal sections of a pipeline in deep underwater locations.

BACKGROUND OF THE INVENTION

The art has heretofore been unable to successfully weld a joint between deeply submerged heavy metal sections of a pipeline. This has necessitated raising the sections to the surface to be welded and thereafter resubmerging them. Raising heavy pipe, generally understood in the industry to have a wall thickness of at least ¼ inch (Schedule 40), is an extremely difficult and cumbersome task requiring numerous derrick barges to raise the line. Moreover, a critical pipeline catenary must be maintained to prevent excessive bending moments which could lead to ultimate rupture. Furthermore, with the metal sections at the surface the operation is vulnerable to weather conditions. Consequently, the art has long sought a more suitable technique for welding offshore underwater pipelines particularly one that can permit welding in situ.

For the past 500 years technology has been adequate for diving craft to be built and operated while submerged. Submersibles have been designed and developed for numerous applications, including that of underwater pipe welding. In the latter instance the submersible would be in the form of a bell chamber which would be lowered about the pipeline at the appropriate operating depth and the chamber purged. Past attempts to weld pipe in this manner have met with no success, primarily due to the erroneous belief that establishing a dry environment in the operating chamber to make a weld was the simulated equivalent of welding on the surface. Continued attempts to adopt the MIG process, conventionally used for welding heavy pipe on the surface, to underwater welding have not as of yet been successful. The same unsatisfactory results apply to all welding processes involving metal transfer through the arc.

SUMMARY OF THE INVENTION

The present invention is based upon the discovery that the nonconsumable electrode inert gas-welding process, commonly known in the welding art as TIG welding, is capable of making excellent high quality welds about the circumference of heavy metal sections of pipeline in deep water. The TIG process when used on the surface under identical conditions, i.e., same inert atmosphere and pipe wall thickness frequently results in insufficient penetration, lack of proper fusion of the filler metal to the edges of the joint, undercutting and other deficiencies. It has been found that in deep underwater locations the characteristics of the TIG arc are so substantially altered in its operating characteristics that none of the detrimental effects exhibited on the surface are present. Moreover, uniform penetration and control is achieved around the entire circumference of the pipe. Furthermore the TIG process does not produce fumes or promote the release of noxious or toxic gases and enables the diver to weld without the need of a special mask. In addition, it is possible to work with a short arc of less than ¼ inches length at high voltage levels.

Although the exact changes that take place in the TIG arc are not precisely known, the effect in the art to produce the changes is believed to be attributable to the increase in ambient pressure. The increase in ambient pressure from atmospheric tends to restrict the arc plasma diameter increasing the energy input to the workpiece. In shallow water the TIG arc resembles that on the surface and performs accordingly. It is only in deep water where the characteristics of the arc become noticeably effected.

Those skilled in the art consider water to be deep when decompression is necessary to return a deep diver from the sea. Although this depth varies it is generally accepted that "deep" is the equivalent of at least 2 atmospheres of pressure, i.e., 33 feet or below. It is at these depths and below that the TIG arc exhibits the characteristics necessary to perform a high quality weld around the circumference of a heavy pipe.

Accordingly, it is an object of this invention to provide a method of making a safe reliable high quality weld between heavy metal sections located deep under water.

Another object is to provide a method which is fumeless and which allows the diver to work without the need for a breathing mask.

Still another object is to provide a method which will produce a deeply penetrating high quality underwater weld which is easy to control and which does not promote the release of noxious or toxic compounds.

Other objects and advantages of the invention will become apparent from the remaining disclosure and appended claims.

Figure 2:
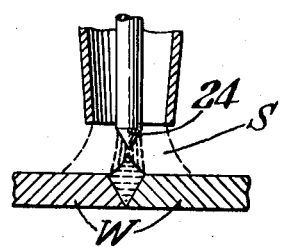

In the drawings:

FIG. 1 is an isometric view, partly broken away, of a suitable apparatus for carrying out the method of the invention, and FIG. 2 is an elevational front sectional view of the weld being made according to the invention with the lower portion of a suitable welding torch apparatus for making the weld.

According to the invention a method is provided for making an electric arc weld between heavy metal sections at deep underwater locations which comprises enclosing the metal section areas to be welded with an enclosure; thereafter introducing a pressurized gas into the enclosure to displace the water therefrom; thereafter establishing an arc between a nonconsumable electrode and the joint formed between the sections to be welded to create a weld puddle therein, and causing relative motion between the arc and the areas to be joined to form a weld. In order to completely avoid the presence of even small amounts of moisture in the areas to be joined, which may cause porosity in the weld, it is preferably to control the pressure in the enclosure as the same is being lowered from the surface to prevent water from rising above a certain level in the enclosure. This may be done by introducing a pressurized gas into the enclosure as the same is being lowered. It is also preferable to flow a shielding gas along the electrode to protect the weld puddle when the atmosphere in the enclosure is not substantially inert. Since this electric arc process is fumeless, it is possible to provide a breathing atmosphere within the enclosure enabling the diver to weld without the need for a special mask. This may be conveniently done by supplying the necessary breathing atmosphere, containing only a small amount of oxygen, through the welding torch as the shielding gas. It is preferable that this atmosphere be substantially inert to protect the weld puddle and also to form a substantially noncombustion supporting atmosphere within the enclosure.

Referring now to the drawing, the invention is illustrated in connection with a section of underwater pipe into which it desired to make a hot tap. After the pipe P is located, guide lines L are tied around it and threaded through eyelets 12 in the enclosure chamber 10 and the chamber is then lowered into the water from a surface ship. In order to to maintain the upper portion of the chamber and the welding equipment therein in a completely dry condition, a pressurized gas is introduced into the chamber through the port 14 and the pressure controlled to displace the water beyond the level it is desired to maintain dry. After the chamber is in contact with the pipe, the slots 16 are sealed off by a diver attaching the skirts 18. Thereafter a diver enters the chamber through the bottom and lowers the hinged grating 20. The diver next opens the control valve inside the chamber (not shown) to supply makeup pressurization gas to displace the remaining water from the chamber. The atmosphere within the chamber is next preferably maintained in a substantially inert condition to prevent the possible occurrence of a fire during the subsequent welding operation. This atmosphere may be supplied through supply lines 22 from the surface ship and may consist of a viable mixture of inert gas such as helium, and oxygen, enabling the diver to work in the chamber without the need of a special mask. The diver begins the welding operation by establishing an arc between the nonconsumable electrode 24 and the sections W to be joined. This arc should have a length between 1/64th and ¼ of an inch in order to maintain adequate control of the weld puddle. This may be done by supplying between 85 and 250 amps at a voltage sufficient to maintain the arc stable. Unexpectedly, sufficient voltage is applied in the pressurized environment to provide enough energy input to form a high quality weld. In one application, the invention was successfully performed upon 10 inch diameter pipe having a wall thickness of about 3/8ths of an inch, over three times the thickness normally welded by the TIG Welding process. To protect the weld puddle, a shielding gas S is preferably flowed along the electrode 24 toward the area to be welded. This shielding gas may contain a small amount of oxygen without interfering with the quality of the weld, and it is therefore possible to supply a viable mixture of inert gas and oxygen into the chamber via the shielding gas, thereby allowing the diver to breathe the chamber atmosphere while welding. After the weld puddle is formed, the weld joint is made by causing relative movement between the arc and the areas to be joined.

I claim:

1. A method of electric arc welding a joint between heavy metal sections of pipeline at deep underwater locations which comprises:
   a. enclosing the deeply submerged metal section areas of the pipe to be joined within an enclosure;
   b. introducing a pressurized gas into the enclosure to displace the water therefrom, and to establish a pressurized environment above that of the atmosphere;
   c. establishing an arc between a nonconsumable electrode and the joint formed between the metal sections to create a weld puddle therein; and
   d. causing relative motion between the arc and the areas to be joined to form a weld around the circumference of the pipe.

2. Method as claimed in claim 1 wherein the arc is maintained at a length of 1/64 inch to ¼ inch at a current level of 85 to 250 amps and with an arc voltage sufficient to maintain a stable arc at said length, whereby increased weld penetration is achieved as compared to welds made upon the surface under the same electrical conditions.

3. Method as claimed in claim 2 including the step of flowing a shielding gas comprising a viable mixture of inert gas and oxidizing gas along the electrode toward the area to be welded to shield the weld puddle and yet enable the diver to breathe the atmosphere within the enclosure.

4. Method as claimed in claim 1 including the step of maintaining a viable mixture of inert gas and oxygen within the enclosure to enable a diver to breathe the atmosphere within the enclosure, and flowing a shielding gas along the electrode toward the area to be joined to shield the weld puddle.

5. A method of electric arc welding a joint between heavy metal sections of a pipeline at deep underwater locations which comprises:
   a. providing an enclosure having an open bottom;
   b. lowering the enclosure toward the area to be joined so as to enclose same;
   c. introducing a pressurized gas into said enclosure while lowering same to maintain the upper portion thereof in a dry condition;
   d. enclosing the deeply submerged section areas to be joined with the enclosure;
   e. thereafter displacing the remaining water from the enclosure with a pressurized gas to establish a pressurized environment above that of the atmosphere and sealing off the area within said enclosure to prevent the entry of water thereinto;
   f. establishing and maintaining a substantially inert noncombustion supporting atmosphere within said enclosure;
   g. establishing an arc between a nonconsumable electrode and the joint formed between the metal sections of pipe to create a weld puddle, said arc having a length of 1/64 inch to ¼ inch at a current level of 85 to 250 amps and with an arc voltage sufficient to maintain a stable arc at said length and current level, and
   h. causing relative motion between the arc and the areas to be joined to form a weld around the circumference of the pipe.